United States Patent
Lee et al.

(10) Patent No.: US 11,958,736 B2
(45) Date of Patent: Apr. 16, 2024

(54) LIQUID DISPENSER

(71) Applicant: LG ELECTRONICS INC., Seoul (KR)

(72) Inventors: Jaehoon Lee, Seoul (KR); Kyuchun Choi, Seoul (KR); Dong Seong Kim, Seoul (KR); Daewoo Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/138,559

(22) Filed: Apr. 24, 2023

(65) Prior Publication Data

US 2023/0264940 A1  Aug. 24, 2023

Related U.S. Application Data

(63) Continuation of application No. 17/569,961, filed on Jan. 6, 2022, now Pat. No. 11,667,509.

(30) Foreign Application Priority Data

Jan. 8, 2021  (KR) .................. 10-2021-0002348

(51) Int. Cl.
*B67D 1/08* (2006.01)
*B67D 1/00* (2006.01)
*G01V 8/18* (2006.01)

(52) U.S. Cl.
CPC ......... *B67D 1/0888* (2013.01); *B67D 1/0014* (2013.01); *G01V 8/18* (2013.01)

(58) Field of Classification Search
CPC .... B67D 1/124; B67D 1/0014; B67D 1/0081; B67D 1/1405; B67D 2001/009;
(Continued)

(56) References Cited

U.S. PATENT DOCUMENTS 4,437,497 A   3/1984  Enander
5,250,262 A * 10/1993  Heidt ............... G01N 35/10
                                              422/63

(Continued)

FOREIGN PATENT DOCUMENTS

KR  10-2016-0005336   1/2016
KR  10-2018-0029665   3/2018
(Continued)

OTHER PUBLICATIONS

U.S. Office Action dated Nov. 2, 2023 issued in U.S. Appl. No. 18/138,518.
(Continued)

*Primary Examiner* — Timothy L Maust
(74) *Attorney, Agent, or Firm* — KED & ASSOCIATES, LLP

(57) ABSTRACT

A water purifier or other liquid dispenser may sense a height of the inlet of a container accurately through an infrared transmitter and an infrared receiver that are disposed at different positions of a water discharge module moving vertically. Additionally, in the water purifier, the water discharge module may discharge purified water at a point spaced a certain distance apart from the inlet of the container, based on infrared sensing, thereby preventing the inlet of the container from contacting the lower surface of the water discharge module.

14 Claims, 7 Drawing Sheets

(58) Field of Classification Search
CPC .... B67D 2001/1483; B67D 2210/0001; B67D 2210/00065
USPC .......................................................... 141/284
See application file for complete search history.

(56) References Cited

U.S. PATENT DOCUMENTS

| | | | |
|---|---|---|---|
| 7,353,850 B2 * | 4/2008 | Greiwe | .............. B67D 1/08 |
| | | | 141/270 |
| 7,654,192 B2 * | 2/2010 | Oehninger | .......... A47J 31/4482 |
| | | | 99/280 |
| 7,677,053 B2 | 3/2010 | Truitt | |
| 7,950,424 B2 | 5/2011 | Ozanne et al. | |
| 9,173,520 B2 | 11/2015 | Jungclaus et al. | |
| 9,301,640 B2 | 4/2016 | Talon et al. | |
| 9,352,950 B2 | 5/2016 | Berger et al. | |
| 10,053,349 B2 | 8/2018 | Yoon | |
| 10,267,535 B2 | 4/2019 | Jeon et al. | |
| 10,343,888 B2 | 7/2019 | Jeon et al. | |
| 10,465,977 B2 | 11/2019 | Lee et al. | |
| 10,889,483 B2 | 1/2021 | Jung et al. | |
| 10,941,031 B2 | 3/2021 | Jung et al. | |
| 10,941,048 B2 | 3/2021 | Moon et al. | |
| 11,186,475 B2 | 11/2021 | Kim et al. | |
| 11,273,463 B2 | 3/2022 | Kim et al. | |
| 11,667,509 B2 * | 6/2023 | Lee | ..................... B67D 1/0888 |
| | | | 141/284 |
| 2007/0017376 A1 | 1/2007 | Oehninger | |
| 2021/0001367 A1 | 1/2021 | Han et al. | |

FOREIGN PATENT DOCUMENTS

| | | |
|---|---|---|
| KR | 10-2018-0088594 | 8/2018 |
| KR | 10-2018-0109259 | 10/2018 |
| KR | 10-2020-0129919 | 11/2020 |
| KR | 10-2020-0131715 | 11/2020 |

OTHER PUBLICATIONS

Korean Office Action dated Aug. 18, 2022 issued in Application No. 10-2021-0002348.
Korean Notice of Allowance dated Feb. 20, 2023 issued in Application No. 10-2021-0002348.

* cited by examiner

LIQUID DISPENSER

CROSS-REFERENCE TO RELATED APPLICATION

This application is a continuation of U.S. patent application Ser. No. 17/569,961, filed on Jan. 6, 2022, which claims priority to Korean Patent Application No. 10-2021-0002348, filed on Jan. 8, 2021, whose entire disclosures are herein incorporated by reference.

BACKGROUND

1. Field

Disclosed herein is liquid dispenser, such as a water purifier, that senses a height of the inlet of a container and discharges filtered raw water to the container

2. Background

Water purifiers are devices that purify water with a filter. A water purifier can be an independent device or a device disposed on the front surface of a fridge. The water purifier discharges filtered raw water, i.e., purified water, to a container placed below a water discharge module. In this case, due to a difference between a height of the bottom surface of the container and a height of the water discharge module, the purified water can splash from the container, causing inconvenience to a user.

To prevent this from happening, water purifiers having a water discharge module capable of moving vertically have been developed. In a water purifier of the related art, a water discharge module moves to a point near the rim of a container, and at the point, a water discharge nozzle installed in the water discharge module discharges the purified water.

To implement the operation of the water purifier of the related art, it is important to measure a height of the rim of a container accurately. In relation to this, various technologies for measuring a height of the rim of a container have been suggested. According to one related art, a contact sensor (i.e., a bumper or a switch) is disposed on the lower surface of a water discharge module, and as the contact sensor contacts the rim of a container, a height of the rim of the container is measured. However, according to this related art, proper hygiene cannot be ensured.

FIG. 1 shows the structure of the water purifier according to a second related art. FIG. 1 is excerpted from FIGS. 4 and 5 in a second related art (Korean Patent Publication No. 10-2018-0109259), and the reference numerals in FIG. 1 are given only to the components in FIG. 1.

Referring to FIG. 1, the water purifier according to the second related art includes a dispenser 12 with an outlet 121, a narrow-beam ultrasonic sensor 17 that transmits and receives a Time of Flight (ToF) signal to measure the height of the container 1, and a wide-beam sensor 18. That is, an optic ultrasonic sensor 17 includes a transmitter 171 and a receiver 172 on a printer circuit board 173, and ultrasonic waves received from the transmitter 171 is reflected by the container 1 and is received by the receiver 172, and based on intensity of the received ultrasonic waves, a height of a container is measured. However, when ToF signals such as ultrasonic signals and the like are used, a height of the rim of a container having a thin rim cannot be measured accurately.

SUMMARY

One aspect of the present disclosure is to provide a liquid dispenser that measures a height of the inlet of a container accurately and discharges purified water into the container. Another aspect of the present disclosure is to provide a liquid dispenser that measures a height of the inlet of a container without causing hygiene problems. Yet another aspect of the present disclosure is to provide a liquid dispenser that measures a height of the inlet of a container accurately even if the rim of the inlet of the container is narrow.

Aspects according to the present disclosure are not limited to the above ones, and other aspects and advantages that are not mentioned above can be clearly understood from the following description and can be more clearly understood from the embodiments set forth herein.

In a liquid dispenser of one embodiment, an infrared transmitter and an infrared receiver are disposed at different positions of a water discharge module moving vertically, thereby sensing a height of the inlet of a container accurately.

In the liquid dispenser of one embodiment, the water discharge module discharges purified water at a point spaced a certain distance apart from the inlet of a container, based on infrared sensing, to prevent the inlet of the container from contacting the lower surface of the water discharge module.

A liquid dispenser in one embodiment may include a main body, a liquid discharge module including a nozzle to discharge a liquid to a container, the liquid discharge module being configured to move the nozzle vertically at a front of the main body, a connecting wall connected to the liquid discharge module and configured to move vertically along with the liquid discharge module, a first infrared transmitter configured to transmit first infrared rays, and an infrared receiver configured to receive the first infrared rays. Here, the first infrared transmitter is provided at a one of a lower surface of the liquid discharge module or a first end of the connecting wall, and the infrared receiver provided at another one of the lower surface of the liquid discharge module or the first end of the connecting wall.

Specific effects are described along with the above-described effects in the section of Detailed Description.

BRIEF DESCRIPTION OF THE DRAWINGS

The embodiments will be described in detail with reference to the following drawings in which like reference numerals refer to like elements wherein.

DETAILED DESCRIPTION

Figure 1:
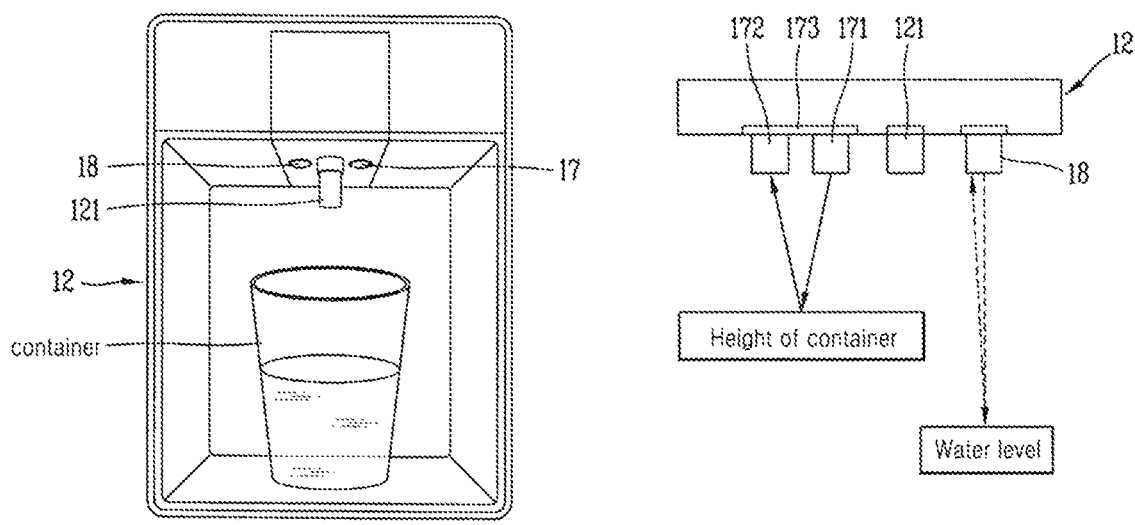
FIG. 1 is a view for describing a related art.
Figure 2:
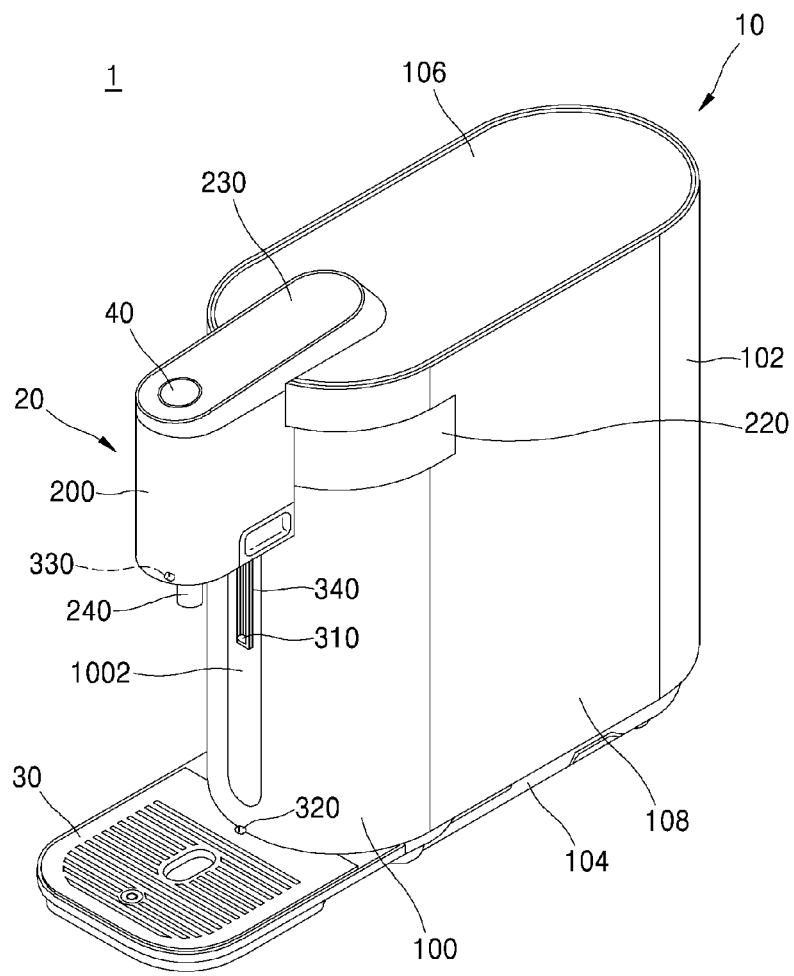
FIG. 2 is a perspective view showing a liquid dispenser in one embodiment.

Hereafter, liquid dispensers in several embodiments are described. FIG. 2 is a perspective view showing a liquid dispenser, such as a water purifier, 1 in one embodiment. Referring to FIG. 2, the water purifier 1 in one embodiment may include a main body 10 and a water discharge module (or liquid discharge module) 20.

The main body 10 is a main component of the water purifier 1 that produces purified water, hot water and cool water by filtering raw water. The main body 10 may include a main body case that forms the exterior of the water purifier 1, and various types of components that filter raw water. The main body case may have a space therein, and various types of components that filter raw water are installed in the inner space.

The main body case may be formed in a way that a plurality of covers 100, 102, 104, 106, 108 are coupled. Specifically, the main body case may include a front cover 100, a rear cover 102, a base cover 104, a top cover 106 and a pair of side covers 108. The covers 100, 102, 104, 106, 108 constituting the main body case may form the exteriors of the front surface, the rear surface, the bottom surface, the upper surface and both the lateral surfaces of the main body 10.

The covers 100, 102, 104, 106, 108 constituting the main body case may be coupled to one another using a coupling member or a coupling structure. Specifically, the front cover 100 and the rear cover 102 may be spaced from each other in a front-rear direction. The pair of side covers 108 may respectively connect to the front cover 100 and the rear cover 102. The top cover 106 may be coupled to the upper ends of the front cover 100, the rear cover 102, and the pair of side covers 108. The base cover 104 may be coupled to the lower ends of the front cover 100, the rear cover 102, and the pair of side covers 108. The base cover 104 may be a cover that is mounted onto a floor surface on which the water purifier 1 is disposed.

The front cover 100 and the rear cover 102 may be formed in a way that the front cover 100 and the rear cover 102 are bent at a predetermined curvature, and the pair of side covers 108 may be formed into a flat plate. The base cover 104 and the top cover 106 may have a front end and a rear end that are rounded, to correspond to the front cover 100 and the rear cover 102.

A flat surface part (or flat surface) 1002 may be formed in the central wall of the front cover 100 in an up-down direction. The flat surface part 1002 may be a dent wall of the front cover 100 that convexly protrudes forward. The flat surface part 1002 may serve as a center point at a time of the rotation of the water discharge module 20 described hereunder. A container such as a cup and the like for collecting water may be disposed in front of the front cover 100. The container may be placed more reliably with the formed flat surface part 1002.

The water purifier 1 may further include a tray 30 onto which the container is mounted. The tray 30 may connect to the base cover 104 and protrude forward. Together with the base cover 104, the tray 30 may form the lower surface of the water purifier 1. The tray 30 may be disposed perpendicularly below a water discharge nozzle 240 described hereunder. The tray 30 may be formed as a structure for storing water that falls down without being accommodated in the container.

The water discharge module 20 may be coupled to and protrude from one side of the main body 10. Specifically, the water discharge module 20 may be disposed to protrude forward from the front cover 100 and the top cover 106. The water discharge module 20 may be coupled to and communicate with the main body 10. At least a wall of the water discharge module 20 may move vertically, and discharge purified water, hot water and cool water to the container.

The water discharge module 20 may include a water discharge module case forming the exterior of the water discharge module 20. The water discharge module case may include a water discharge top cover 230, a water discharge lifting cover 200, 210 and a water discharge side cover 220.

The water discharge side cover 220 may be a cover that is mounted onto the main body 10. The water discharge side cover 220 may be disposed in a way that the front cover 100 is divided into an upper wall and a lower wall. Accordingly, the front cover 100 may be divided into a lower front cover coupled to the base cover 104, and an upper front cover coupled to the top cover 106.

The water discharge lifting cover 200, 210 may be disposed to protrude from the front cover 100 forward. The water discharge lifting cover 200, 210 may be disposed to convexly protrude from the water discharge side cover 220 outward.

The water discharge top cover 230 may extend from the top cover 106 and be disposed to cover the upper end of the water discharge lifting cover 200, 210. An input part (or button) 40 for allowing a user to input an instruction for a predetermined operation may be disposed on the water discharge top cover 230. The input part 40 may be implemented as a variety of forms such as a button-type input part, a touch-type input part and the like.

The water discharge module 20 may include a water discharge nozzle (or nozzle0 240 that discharges a liquid such as purified water, cool water and hot water. The water discharge nozzle 240 may be installed in a way that the water discharge nozzle 240 is exposed to the lower surface of the water discharge module 20. The tray 30 may be disposed below the water discharge nozzle 240 perpendicularly.

A water discharge pipe (not illustrated) connected to the water discharge nozzle 240 may be disposed inside the water discharge module 20. The water discharge pipe may extend to the inside of the water discharge module 20, in the main body 10, and be coupled to the water discharge nozzle 240. In one embodiment, the water discharge module 20 may move such that a position of the water discharge nozzle 240 changes.

Figure 3:
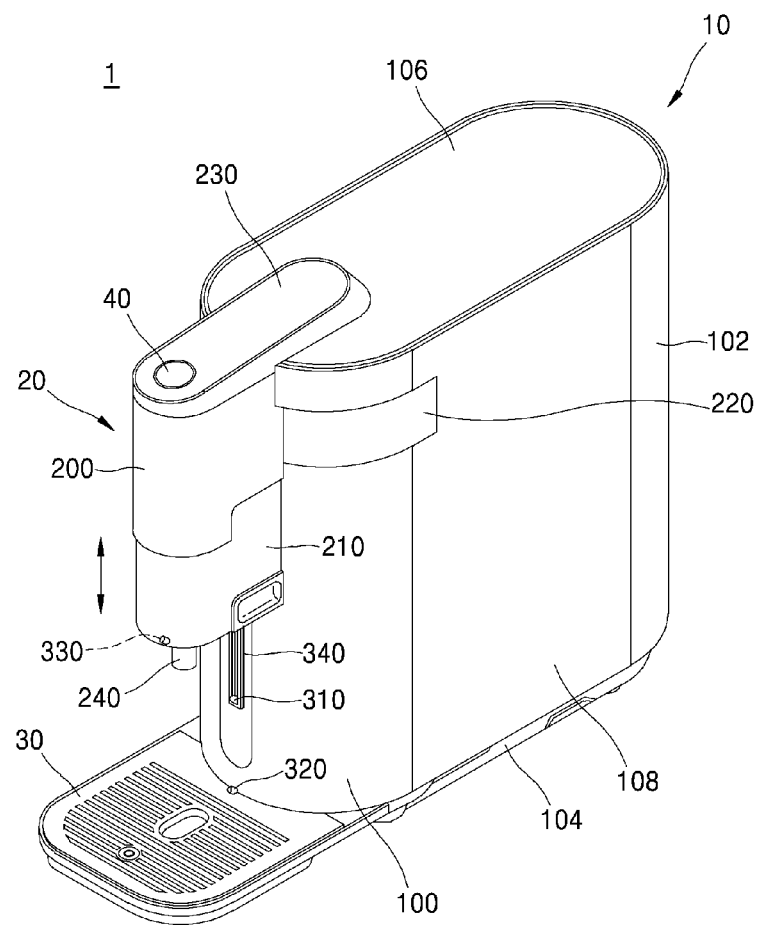
FIG. 3 is a perspective view showing a liquid dispenser in which a position of a water discharge nozzle changes, in one embodiment.

FIG. 3 is a perspective view showing a water purifier 1 in which a position of a water discharge nozzle 20 changes, in one embodiment. Referring to FIG. 3, the water discharge module 20 may move vertically. That is, the water discharge module 20 may move up and down.

The vertical movement of the water discharge module 20 is described as follows. The water discharge lifting cover 200, 220 includes a first lifting cover 200 and a second lifting cover 210. The first lifting cover 200 may be fixed to the water discharge side cover 220. That is, the first lifting cover 200 does not move vertically. The water discharge top cover 230 may be coupled to the upper end of the first lifting cover 200. The second lifting cover 210 may be disposed inside the lifting cover 200 and move vertically along the first lifting cover 200. The water discharge nozzle 240 may be disposed on the lower surface of the second lifting cover 210 and move vertically along with the second lifting cover 210.

Additionally, the water discharge module 20 may lift automatically, and the automatic lift of the water discharge module 20 may be performed by a controller (not illustrated) disposed in the main body 10. The controller may be a processor-based device, and for example, may be a microcomputer (micom). Herein, the processor may include one or more of a central processing unit (CPU), an application processor, or a communication processor.

The controller (not illustrated) may control a compressor, a cooling fan, various types of valves, a sensor, an induction heating assembly and the like that are installed inside the main body 10, in particular, the lifting movement of the water discharge module 20. The controller (not illustrated) receives information on receipt intensity of infrared rays from an infrared receiver 330 described hereunder, and based on the information, controls the water discharge module 20's lifting movement, and the water discharge nozzle 240's operation of discharging water.

Referring to FIGS. 2 and 3, the water purifier 1 includes a first infrared transmitter 310, a second infrared transmitter 320, and an infrared receiver 330. The first infrared transmitter 310, the second infrared transmitter 320, and the infrared receiver 330 are components for detecting a height of the inlet (i.e., the rim) of a container.

The first infrared transmitter 310 may be disposed at a connecting portion (or connecting wall) 340, and transmit first infrared rays. Specifically, the connecting portion 340 has a shape in which the connecting portion extends in the height-wise direction of the water discharge module 20. The other end of the connecting portion 340 may be attached to the first later surface of the water discharge module 20 that faces the front of the main body 10, and the first infrared transmitter 310 may be disposed at one end of the connecting portion 340. One end of the connecting portion 340 is an end on the opposite side of the other end of the connecting portion 340, and spaced a certain distance part from the lower surface of the water discharge module 20. As the water discharge module 20 move vertically, the connecting portion 340 attached to the first lateral surface of the water discharge module 20 moves vertically. Accordingly, the first infrared transmitter 310 also moves vertically.

The first infrared transmitter 310 may be disposed obliquely with respect to a bottom surface, at one end of the connecting portion 340. For example, the first infrared transmitter 310 may be disposed obliquely at angles from 5 degrees to 85 degrees. The first infrared transmitter 310's operation of transmitting first infrared rays may be controlled by the controller.

The second infrared transmitter 320 may be disposed at the front of the main body 10, and transmit second infrared rays. In this case, the second infrared transmitter 320 may be disposed below the first infrared transmitter 310. Specifically, the second infrared transmitter 320 may be disposed at a point where the front of the main body 10 meets the upper surface of the tray 30. The second infrared transmitter 320 may be disposed obliquely with respect to a bottom surface. For example, the second infrared transmitter 320 may be disposed obliquely at angles from 5 degrees to 85 degrees. The second infrared transmitter 320's operation of transmitting second infrared rays may be controlled by the controller.

The first infrared transmitter 310's operation of transmitting first infrared rays and the second infrared transmitter 320's operation of transmitting second infrared rays are not performed at the same time. That is, when the first infrared transmitter 310 transmits first infrared rays, the second infrared transmitter 320 does not transmit second infrared rays, and when the second infrared transmitter 320 transmits second infrared rays, the first infrared transmitter 310 does not transmit first infrared rays.

The infrared receiver 330 may be disposed on the lower end surface of the water discharge module 20, and receive first infrared rays and second infrared rays. In this case, since the first infrared transmitter 310 and the second infrared transmitter 320 do not operate at the same time, as described above, the infrared receiver 330 receives any one of the first infrared ray and the second infrared ray, at a certain time point.

Specifically, the infrared receiver 330 may be disposed on the lower surface of the water discharge module 20, which is farthest from the front of the main body 10. Thus, a range of the receipt of infrared rays may increase. When the water discharge module 20 moves vertically, the infrared receiver 330 also moves vertically.

The infrared receiver 330 may be disposed obliquely with respect to a bottom surface, on the lower surface of the water discharge module 20. For example, the infrared receiver 330 may be disposed at angles corresponding to those of the first infrared transmitter 310 and the second infrared transmitter 320 while being disposed obliquely at angles from 5 degrees to 85 degrees. The infrared receiver 330 transmits information on receipt intensity of the received infrared rays to the controller, and the transmitted information may be used for the water discharge module 20's vertical movement and the water discharge nozzle 240's operation of discharging water.

FIGS. 2 and 3 show that the first infrared transmitter 310 is disposed at one end of the connecting portion 340 while the infrared receiver 330 is disposed on the lower end surface of the water discharge module 20. However, this configuration is provided only as an example. The infrared receiver 330 may be disposed at one end of the connecting portion 340 while the first infrared transmitter 310 may be disposed on the lower end surface of the water discharge module 20. However, to improve receipt performance, the infrared receiver 330, for example, is disposed on the lower end surface of the water discharge module 20, which is not affected by external disturbances such as the sunlight and the like.

Hereafter, the water purifier 1's operation of discharging purified water is described further with reference to FIGS. 4 to 7. As illustrated in FIG. 2, the water discharge module 20 is placed at a default point, and a container (400; see FIGS. 4 to 6) is not placed on the upper surface of the tray 30. Then under the control of the controller, the second infrared transmitter 320 transmits second infrared rays, and the infrared receiver 330 receives the second infrared rays. In this case, the first infrared transmitter 310 does not transmit first infrared rays, and the infrared receiver 330 transmits receipt intensity of the second infrared rays to the controller in real time. Since the container 400 is not placed on the upper surface of the tray 30, the second infrared rays have maximum receipt intensity.

Figure 4:
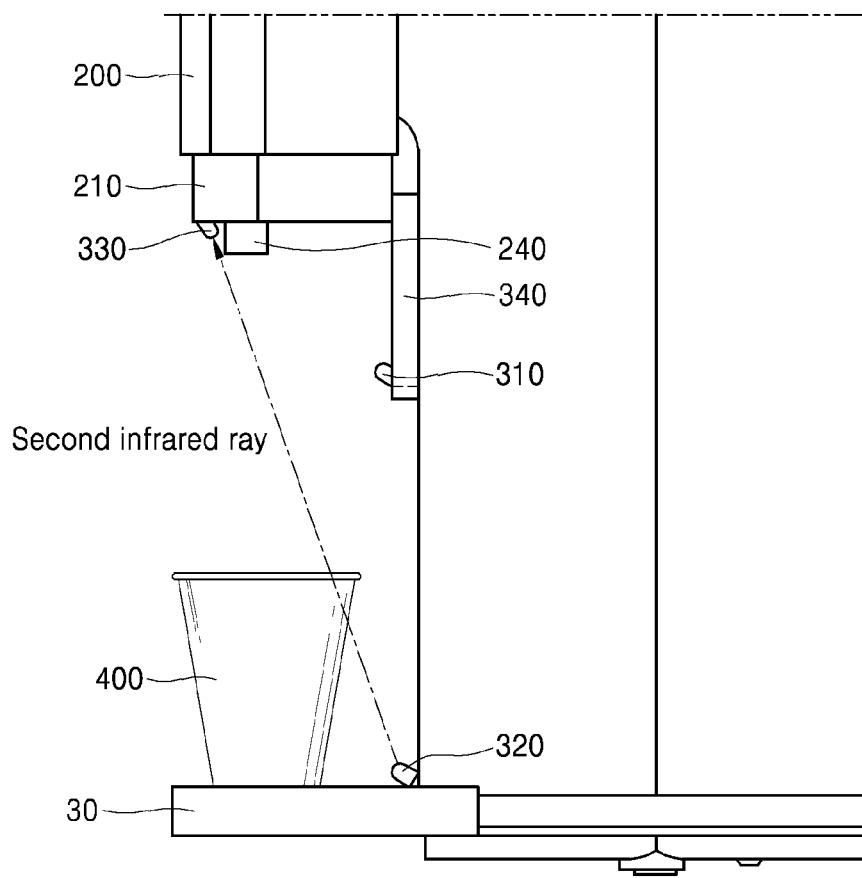
FIGS. 4 to 6 are views for describing a liquid dispenser's operation of discharging purified water in one embodiment.

Referring to FIG. 4, in a state in which the second infrared transmitter 320 transmits second infrared rays, the container 400 is placed on the upper surface of the tray 30. Accordingly, the second infrared rays pass through the container 400 and are received by the infrared receiver 330. In this case, receipt intensity of the second infrared rays decreases unlike the receipt intensity in the state in which the container 400 is not placed.

Figure 7:
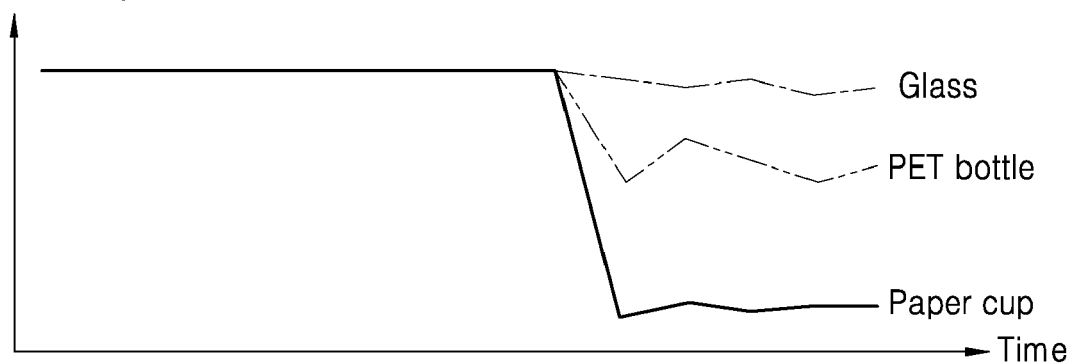
FIG. 7 is a view showing a relationship between time, and receipt intensity of infrared rays, in one embodiment.

FIG. 7 is a view showing a relationship between time, and receipt intensity of infrared rays. Referring to FIG. 7, when the container 400 is not placed on the upper surface of the tray 30, infrared rays have maximum receipt intensity. When the container 400 is placed on the upper surface of the tray 30, receipt intensity of infrared rays is attenuated, regardless of the sort of the container 400.

In one embodiment, the controller compares receipt intensity of second infrared rays with threshold receipt intensity, to ascertain whether a container 400 is placed on the upper surface of the tray 30. The threshold receipt intensity may be receipt intensity that is less than maximum receipt intensity of second infrared rays by a predetermined percent. For example, the threshold receipt intensity may be a value that is 95% of the maximum receipt intensity of second infrared rays. Referring to FIG. 7, the second infrared rays may be received by the infrared receiver 330 at intensity less than the threshold receipt intensity in all of the glass, the PET bottle, and the paper cup.

When ascertaining that the container 400 is placed on the upper surface of the tray 30, as a result of the comparison of the receipt intensity of second infrared rays and the threshold receipt intensity, the controller controls the water discharge module 20 such that the water discharge module 20 starts to move downward, and the first infrared transmitter 310 transmits first infrared rays, and the infrared receiver 330 receives the first infrared rays. In this case, the second infrared transmitter 320 does not transmit second infrared rays, and the infrared receiver 330 transmits receipt intensity of the first infrared rays to the controller in real time.

In one embodiment, the controller may control the downward movement of the water discharge module 20, based on the receipt intensity of the first infrared rays received from the infrared receiver 330. That is, when the receipt intensity of the first infrared rays is the threshold receipt intensity or greater, the controller allows the water discharge module 20 to keep moving downward, and at a first time point when the receipt intensity of the first infrared rays is less than the threshold receipt intensity, the controller may stop the water discharge module 20 from moving downward. The threshold receipt intensity is described above.

Figure 5:
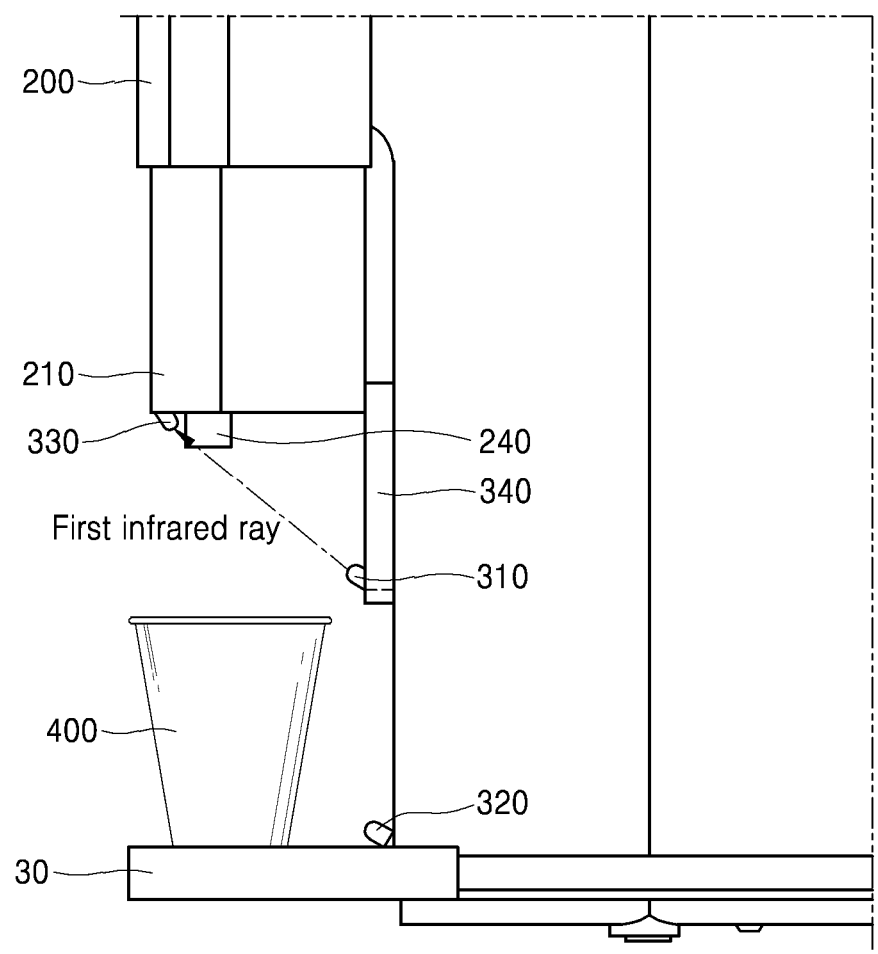

Specifically, when the water discharge module 20 starts to move, the first infrared rays do not pass through the container 400, and have maximum receipt intensity that is greater than the threshold receipt intensity. Accordingly, the water discharge module 20 continues to move downward, as illustrated in FIG. 5.

Figure 6:
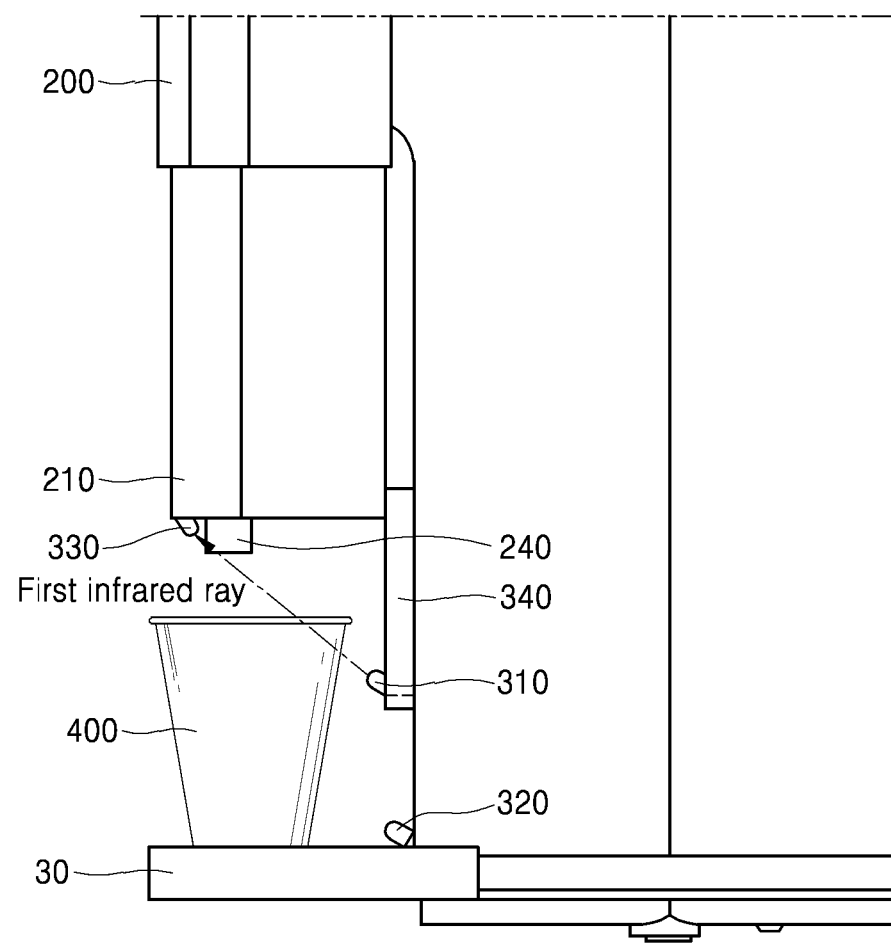

Then, as a result of the downward movement of the water discharge module 20, the first time point at which the receipt intensity of the first infrared rays is less than the threshold receipt intensity comes. That is, at the first time point, the first infrared rays pass through the container 400, and are received by the infrared receiver 330. Accordingly, the controller stops the downward movement of the water discharge module 20, as illustrated in FIG. 6.

In this case, the lower surface of the water discharge module 20 that stops moving is spaced upward from a height of the inlet of the container 400 by a first distance. That is, the height of the inlet of the container 400 corresponds to a value at which the first distance is deducted from a height of the lower surface of the water discharge module 20. Additionally, the lower surface of the water discharge module 20 does not contact the inlet of the container 400. Thus, hygiene problems can be solved.

When the movement of the water discharge module 20 stops, the controller controls the water discharge nozzle 240 such that the water discharge nozzle 240 discharges purified water. As a result, a distance between the water discharge nozzle 240 and the bottom surface of the container 400 decreases, and the purified water discharged does not splash outward from the container 400.

In one embodiment, the controller may determine a speed of the downward movement of the water discharge module 20, based on receipt intensity of second infrared rays. Specifically, when the receipt intensity of second infrared rays is attenuated greatly in a paper cup and the like, an infrared sensing degree of the infrared receiver 330 is high, and the infrared receiver 330 receives first infrared rays effectively. However, when the receipt intensity of second infrared rays is attenuated slightly in a glass and the like, an infrared sensing degree of the infrared receiver 330 is low, and the infrared receiver 330 cannot receive first infrared rays effectively. Accordingly, the controller may determine a speed of the downward movement of the water discharge module 20, based on the receipt intensity of second infrared rays.

In one example, when receipt intensity of second infrared rays in the state in which the container 400 is placed is less than receipt intensity of second infrared rays in the state in which the container 400 is not placed by the threshold receipt intensity or greater, the controller may control the water discharge module 20 such that the water discharge module 20 moves at slow speed (first speed). Further, when receipt intensity of second infrared rays in the state in which the container 400 is placed is greater than receipt intensity of second infrared rays in the state in which the container 400 is not placed by the threshold receipt intensity or greater, the controller may control the water discharge module 20 such that the water discharge module 20 moves at normal speed (second speed).

In another example, the controller may control a speed of the downward movement of the water discharge module 20 such that the speed of the downward movement is adversely proportional to the receipt intensity of second infrared rays in the state in which the container 400 is placed.

In summary, in the water purifier 1 of one embodiment, the first infrared transmitter 310 and the infrared receiver 330 are disposed at different positions of the water discharge module 20 that moves vertically, thereby measuring a height of the inlet of a container 400 accurately. In particular, since the first infrared transmitter 310 and the infrared receiver 330 move downward, a height of the inlet of a container 400 may be measured accurately, even if the rim of the inlet of the container 400 is narrow. Additionally, the water purifier 1 discharges purified water at a point spaced a certain distance apart from the inlet of a container 400, thereby preventing the purified water from splashing outward from the container 400.

Further, in the water purifier 1 of one embodiment, since the water discharge module 20 discharges purified water at a point spaced a certain distance apart from the inlet of a container 400, based on infrared sensing, the inlet of the container 400 does not contact the lower surface of the water discharge module. Thus, hygiene problems can be solved.

One aspect of the present disclosure is to provide a water purifier that measures a height of the inlet of a container accurately and discharges purified water into the container. Another aspect of the present disclosure is to provide a water purifier that measures a height of the inlet of a container without causing hygiene problems. Yet another aspect of the present disclosure is to provide a water purifier that measures a height of the inlet of a container accurately even if the rim of the inlet of the container is narrow. Aspects according to the present disclosure are not limited to the above ones, and other aspects and advantages that are not mentioned above can be clearly understood from the following description and can be more clearly understood from the embodiments set forth herein.

In a water purifier of one embodiment, an infrared transmitter and an infrared receiver are disposed at different positions of a water discharge module moving vertically, thereby sensing a height of the inlet of a container accurately. In the water purifier of one embodiment, the water discharge module discharges purified water at a point spaced a certain distance apart from the inlet of a container, based on infrared sensing, to prevent the inlet of the container from contacting the lower surface of the water discharge module.

A water purifier in one embodiment may include a main body included a filter for filtering raw water, a water discharge module configured to discharge the filtered raw water to a container while vertically moving at a front of the main body, a connecting wall connected to the water discharge module and configured to move vertically along with the water discharge module, a first infrared transmitter disposed at a first point of the water purifier and configured to transmit first infrared rays, and an infrared receiver disposed at a second point of the water purifier and configured to receive the first infrared rays. Here, the first point of the water purifier is any one point of, a lower end surface of the water discharge module or one end of the connecting wall, and the second point of the water purifier is the other point of, the lower end surface of the water discharge module or the one end of the connecting wall. In this case, the other end of the connecting wall may be attached to a first lateral surface of the water discharge module, which faces the front of the main body, and one end of the connecting wall may be spaced a certain distance apart from the lower surface of the water discharge module.

The water purifier may further include a controller configured to receive receipt intensity of the first infrared rays from the infrared receiver and to control a movement of the water discharge module based on the receipt intensity of the first infrared rays. When the water discharge module moves downward, the infrared receiver may transmit the receipt intensity of the first infrared rays to the controller in real time, and the controller may stop a movement of the water discharge module at a first time point when the receipt intensity of the first infrared rays is less than predetermined threshold receipt intensity.

Additionally, a water discharge nozzle may be disposed on the lower surface of the water discharge module, the controller may control the water discharge nozzle to discharge the filtered raw water when the water discharge module stops, and the lower surface of the water discharge module that stops moving may be spaced upward from a height of the inlet of the container by a first distance. The threshold receipt intensity may be less than maximum receipt intensity of the first infrared rays received by the infrared receiver by a predetermined percent.

The first infrared transmitter may be disposed at one end of the connecting wall, and the infrared receiver may be disposed on the lower end surface of the water discharge module. Additionally, the infrared receiver may be disposed on the lower surface of the water discharge module, which is farthest from the front of the main body.

The water purifier may further include a second infrared transmitter disposed at the front of the main body and configured to transmit second infrared rays, and the second infrared transmitter may be disposed below the first infrared transmitter, and the infrared receiver may receive the second infrared rays. Additionally, the water purifier may further include a tray disposed at a lower side of the water discharge module and configured to move vertically, and the second infrared transmitter may be disposed at a point where the front of the main body meets an upper surface of the tray.

When the water discharge module is disposed at an initial default point, the second infrared transmitter may transmit the second infrared rays, and the infrared receiver may receive the second infrared rays. When the water discharge module starts to move downward from the initial default point, the first infrared transmitter may transmit the first infrared rays, and the infrared receiver may receive the first infrared rays.

The controller may receive receipt intensity of the second infrared rays from the infrared receiver, and when the receipt intensity of the second infrared rays is less than predetermined threshold receipt intensity, the controller may control the water discharge module such that the water discharge module moves downward. Further, the controller may determine a speed of the downward movement of the water discharge module, based on the receipt intensity of the second infrared rays.

According to the present disclosure, purified water is discharged at a point spaced a certain distance apart from the inlet of a container, thereby preventing the purified water form splashing from the container outward. According to the present disclosure, the inlet of a container does not contact the lower surface of a water discharge module, thereby solving hygiene problems.

The components and features and the like are described above with reference to the limited embodiments and accompanying drawings set forth herein for a better understanding of the subject matter in the present disclosure. However, the subject matter of the disclosure is not limited to the embodiments set forth herein. Modifications and changes can be drawn from the disclosure in various different ways by one having ordinary skill in the art. Therefore, it is to be understood that the technical spirit of the disclosure is not construed as being limited by the embodiments herein and that equivalents and equivalent modifications drawn from the scope of the appended claims are included in the scope of the technical spirit of the disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
a main body;
a liquid discharge module including a nozzle to discharge a liquid to a container, the liquid discharge module being configured to move the nozzle vertically at a front of the main body;
a connecting wall connected to the liquid discharge module and configured to move vertically along with the liquid discharge module;
a first infrared transmitter configured to transmit first infrared rays and provided at a one of a lower surface of the liquid discharge module or a first end of the connecting wall; and
a second infrared transmitter provided at the front of the main body and configured to transmit second infrared rays,
wherein a speed of a downward movement of the liquid discharge module is determined based on a receipt intensity of the second infrared rays.

2. The liquid dispenser of claim 1, further comprising:
an infrared receiver configured to receive the first infrared rays,
wherein the infrared receiver provided at another one of the lower surface of the liquid discharge module or the first end of the connecting wall.

3. The liquid dispenser of claim 2, wherein:
the infrared receiver is configured to determine the receipt intensity of the first infrared rays at the infrared receiver, and
the liquid water discharge module is configured to move the nozzle based on the receipt intensity of the first infrared rays.

4. The liquid dispenser of claim 3, wherein:
when the liquid discharge module moves the nozzle downward, the infrared receiver determines the receipt intensity of the first infrared rays in real time, and
the liquid discharge module stops the downward movement of the nozzle at a first time when the receipt intensity of the first infrared rays is less than a predetermined threshold receipt intensity.

5. The liquid dispenser of claim 4, wherein:
the nozzle is positioned on the lower surface of the liquid discharge module,
the nozzle discharges the liquid after the liquid discharge module stops the downward movement of nozzle, and
the lower surface of the liquid discharge module is spaced upward from a height of an inlet of the container by a first distance when the liquid discharge module stops the downward movement of nozzle.

6. The liquid dispenser of claim 4, wherein the threshold receipt intensity is a predetermined percentage of a maximum receipt intensity of the first infrared rays received by the infrared receiver.

7. The liquid dispenser of claim 2, wherein the first infrared transmitter is positioned at the first end of the connecting wall, and
the infrared receiver is positioned on the lower surface of the liquid discharge module.

8. The liquid dispenser of claim 7, wherein the infrared receiver is provided on a region of the lower surface of the liquid discharge module that is farthest from the front of the main body in a horizontal direction.

9. The liquid dispenser of claim 7, wherein the second infrared transmitter is provided below the first infrared transmitter, and the infrared receiver is configured to receive the second infrared rays from the second infrared transmitter.

10. The liquid dispenser of claim 9, further comprising:
a tray configured to support the container and positioned below the liquid discharge module,
wherein the second infrared transmitter is provided where the front of the main body meets an upper surface of the tray.

11. The liquid dispenser of claim 9, wherein when the liquid discharge module positions the nozzle at an initial default point, the infrared receiver receives the second infrared rays, and
when the liquid discharge module starts to move the nozzle downward from the initial default point, the infrared receiver receives the first infrared rays.

12. The liquid dispenser of claim 11, wherein the infrared receiver determines the receipt intensity of the second infrared rays, and
when the receipt intensity of the second infrared rays is less than a predetermined threshold receipt intensity, the liquid discharge module starts to move the nozzle downward.

13. The liquid dispenser of claim 1, further comprising a filter provided in the main body and configured to filter water, wherein the liquid discharged by the nozzle is the filtered water.

14. The liquid dispenser of claim 1, wherein the liquid discharge module further includes a first cover that is coupled to the main body, and a second cover that includes the nozzle and is slidably coupled to the first cover to move vertically relative to the main body, and wherein the connector wall is connected to the second cover of the liquid discharge module.

\* \* \* \* \*